April 14, 1959      P. PRACHT      2,881,742
DUAL CIRCULATION VAPOR GENERATING AND SUPERHEATING UNIT
Filed March 5, 1954
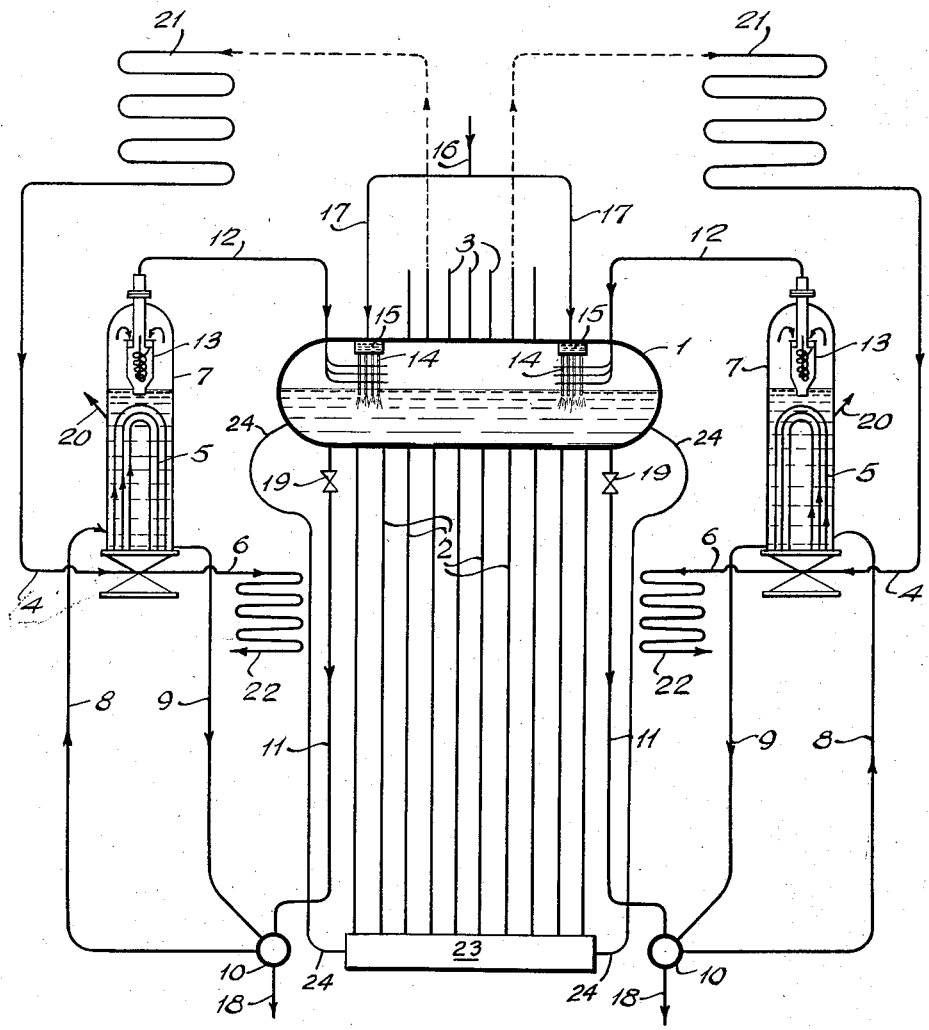
INVENTOR
PAUL PRACHT
BY R. W. Holbrook
ATTORNEY United States Patent Office 2,881,742
Patented Apr. 14, 1959

2,881,742
DUAL CIRCULATION VAPOR GENERATING AND SUPERHEATING UNIT

Paul Pracht, Oberhausen, Rhineland, Germany, assignor to The Babcock & Wilcox Company, New York, N.Y., a corporation of New Jersey Application March 5, 1954, Serial No. 414,425

Claims priority, application Germany March 13, 1953

7 Claims. (Cl. 122—459)

This invention relates to a vapor generating and superheating unit having a low concentration high heat input vapor generating circulation system with blow-down to a second vapor generating circulation system characterized by low heat of input and high concentration. The vapor generated in the second circulation system preferably is discharged into the vapor space of the first circulation system, and all or a major part of this vapor from the second circulation system is condensed by the absorption of heat therefrom by the incoming feed liquid of the first circulation system.

The vapor generating tubes of both systems absorb heat from heating gases, with the tubes of the second circulation system preferably heated by gases of a temperature lower than the temperature of the gases heating the vapor generating tubes of the first circulation system.

The invention is exemplified herein by a vapor generating and superheating unit in which the major part (i.e. 80%) of the total generated vapor is generated in a high heat input circulating system having vapor generating tubes along the walls of a high temperature furnace. The gases after leaving the furnace pass over the tubes of a primary superheater section and then over a secondary superheater section. The remainder of the vapor is generated in the second circulation system which includes an inter-stage indirect contact attemperator. This attemperator preferably includes a pressure vessel normally having a body of liquid of high concentration in its liquid space. Above the liquid space and within the pressure vessel is a vapor space in which there is disposed a vapor and liquid separator. The vapor outlet of this separator communicates with conduit means conducting the separated vapor to the vapor and liquid drum of the first circulation system. The degree of concentration of the liquid in the attemperator is controlled by a valved blow-down leading from its liquid space. Part of the heat for generating vapor from the liquid in the attemperator is received from superheated vapor passing from the primary superheater section through tubes immersed in the liquid of the attemperator. From these immersed tubes attemperated vapor passes to the secondary section of the superheater. The remaining part of the heat for generating vapor within the attemperator is received by riser tubes heated by gases from the furnace and the attemperator circulation system also includes downcomers leading from the attemperator liquid space to the inlets of the attemperator risers. Controlled blown-down from the first circulation system leads from its drum to the inlets of the attemperator risers.

The dual circulation system of the invention involves the substantial reduction in heat loss by materially reducing the overall blow-down. When all or a major part of the vapor generated in the high concentration attemperator circulation system is condensed by a feed liquid entering the first circulation system almost all of the vapor from the unit is of high purity, and of low silica content.

This invention also has for one of its objects a material reduction in the failure of vapor generating tubes.

This result is achieved by material reduction in the concentration of liquid fed to the vapor generating tubes by the main or first circulation system.

The blow-down from the first circulation system serves as feed liquid for the second circulation system, and the blow-down of the latter may take place to atmosphere. This means that the liquid concentration of the first circulation system would approach the concentration of the incoming feed liquid.

The invention is clearly and briefly specified in the appended claims but for a clearer understanding of the invention, its uses and advantages, recourse should be had to the following description which refers to the accompanying drawing. The drawing is a diagrammatic disclosure of an illustrative dual circulation vapor generating and superheating unit.

In the drawing, the vapor and liquid drum 1, together with the upright vapor generating tubes 2, their lower header 23, downcomers 24, the primary superheater sections 21 and the secondary superheater sections 22, are intended to be diagrammatically representative of a modern high capacity and high temperature vapor generating and superheating unit, such as shown, for example, in U. S. patent to Raynor 2,512,677 of June 27, 1950. In such a unit, the vapor generating tubes or risers 2 would be furnace wall tubes subject to high heat input and the gases leaving the furnace would first pass over the secondary convection superheater section 22 and, thereafter, pass over the tubes of the convection primary superheater section 21. In the vapor and liquid drum 1, vapor and liquid mixtures from the risers 2 would be subject to the vapor and water separating action of known separators, preferably of the type indicated by U.S. patent to Rowand et al. 2,289,970 of July 14, 1942. Vapor separated by such devices within drum 1 passes through tubes 3 and possibly through an interposed header to the inlets of the primary superheater sections 21. From the outlet of these superheater sections, the superheated vapor passes through lines 4 to the vapor inlets of attemperators 7, preferably of the type indicated by the U.S. patent to Lucke et al. 1,973,721. From the vapor inlet chambers of these attemperators, vapor passes through the U-tubes 5 which are immersed normally in relatively high concentration vaporizable liquid in the attemperators. The vapor is cooled in these tubes and the heat lost in this cooling generates vapor in the vapor spaces at the upper parts of the attemperators. This generated vapor may be mixed with entrained liquid, and to remove the latter, the mixture passes through the centrifugal vapor and liquid separators 13. The vapor from these separators passes through the lines or conduits 12 between and over closely spaced tubes 14 conducting lower temperature feed liquid from the chambers 15. The latter are fed from an appropriate feed liquid source through the lines 16 and 17.

Attemperator vapor from the U-tubes 5 passes to the vapor outlets of the attemperators and through the lines 6 through the secondary, or high temperature, superheater sections 22, and thence to a point of use.

The circulating system described above is a first circulation system, subject to high heat input and subject to liquid content of low concentration equal to or approaching the purity of the feed liquid. Such low concentration is promoted by blow-down from the liquid space of the drum 1 through the tubes 11 which lead to the headers 10 of the high concentration second circulating systems. Such blow-down may be regulated by control of the valves 19 in the lines 11.

The circulating systems of the attemperators include the risers 8 leading from the headers 10 to the liquid spaces of the attemperators, it being within the purview of the invention that these risers are subject to gas flow from the furnace of the first circulation system. The attemperator circulation systems further include the downcomers 9 leading from the liquid spaces of the attemperators to the headers 10. Thus, the attemperators are subject to additional heat input because of the heating of the risers 8, this heat input resulting in the generation of additional vapor for passage through the cyclones 13 and the lines 12 at the ends of which the vapor is subject to condensation effected by the feed liquid passing downwardly through the tubes 14.

In the illustrative unit the relatively high concentration of the vaporizable liquid in the attemperators is maintained within predetermined limits by controlled blow-down through connections 18 from the header 10 and/or by blow-down directly from the liquid spaces of the attemperators through connections such as indicated at 20.

In the illustrative unit the blow-down through the lines 11 acts as make-up liquid for the second circulation system or systems and about 80% of the total generated vapor is generated in the first circulation system.

The illustrative unit results in a substantial reduction in the amount of overall blow-down, and this is particularly advantageous in units operating with a high percentage of make-up or feed liquid in-flow, and operating at high pressures and temperatures. The condensing with feed liquid of all or part of the vapor generated in the high concentration section of the unit has the result that vapor discharged from that section is restricted almost entirely to high purity vapor of low silica content which is in equilibrium with the liquid of the low concentration of the attemperator circulating systems.

What is claimed is:

1. In a dual circulation vapor generating and superheating unit, a first vapor generating circulation system including a vapor and liquid drum and having tubes receiving heat from heating gases opening to said drum, means supplying feed liquid to said first circulating system, a superheater receiving the vapor generated in the first system, a second vapor generating circulating system including an attemperator having a vapor and liquid chamber with a liquid space and a vapor space therein, the second recirculating system also including gas heated vapor generating tubes connected to the attemperator liquid space, means directly connecting the liquid space of the attemperator with the inlets of the vapor generating tubes of the second circulation system, said last named means including downcomers, tubular means conducting vapor from the vapor space of the attemperator to the vapor space of the first circulation system, and tubular blow-down means acting as make-up means conducting liquid from the first circulation system to the inlets of the vapor generating tubes of the second circulation system.

2. In a vapor generating and superheating unit, a primary fluid circulating and vapor generating circulation system including a vapor and liquid drum having connected therewith vapor generating tubes normally subjected to the heat of high temperature gases, a vapor superheater normally receiving vapor separated from liquid in said drum, an indirect vapor attemperator having spaced tubes in external contact with the vaporizable liquid, conduit means conducting superheated vapor from the superheater to and through the latter tubes, said indirect contact attemperator normally having a liquid level separating a vapor space and a liquid space therein, first conduit means connecting the vapor space of the attemperator with the vapor space of the drum, a header disposed at a level beneath the level of the attemperator, downcomer means connecting the liquid space of the attemperator with the header, riser means subject to the heat of such high temperature gases and connecting the liquid space of the attemperator to the header, and vapor and liquid separating means disposed in the vapor space of the attemperator and having a separated vapor outlet in direct communication with the conduit means connecting the vapor space of the attemperator and the vapor space of the drum, the attemperator together with its downcomer and riser means and its connections with the first circulation system constituting a second circulation system.

3. In a dual circulation vapor generating and superheating unit, a first circulation system including a vapor and liquid drum, vapor generating tubes exposed to heat from high temperature heating gases and having their outlets connected to said vapor and liquid drum, drum connecting means through which relatively pure feed liquid is normally delivered to the drum, a superheater normally receiving vapor from the drum, an indirect contact vapor attemperator having a vapor and liquid chamber with a liquid level and a liquid space therein, spaced tubes disposed within the liquid space and directly connected with the superheater, tubular means connecting the vapor space of the attemperator vapor and liquid chamber with the vapor space of the drum, a header, downcomer means directly connecting the liquid space of the attemperator with the header, riser means directly connecting the liquid space of the attemperator with the header and exposed to heat from said gases, blow-down conduit means directly connecting the liquid space of the drum with the header, the attemperator together with its downcomer and riser means and the connection with the first circulation system constituting a second circulation system, and blow-down means in communication with the liquid space of the attemperator and operable to permit the second circulation system to be effective with its liquid at a much higher concentration than the liquid in the drum.

4. In a dual circulation vapor generating and superheating unit, a first circulation system of high heat input and low concentration including a vapor and liquid drum, vapor generating tubes exposed to heat from high temperature heating gases and having their outlets connected to said vapor and liquid drum, a furnace generating gases for heating the unit, drum connecting means through which relatively pure feed liquid is normally delivered to the drum, a gas heated vapor superheater normally receiving all of its vapor from the drum, an indirect contact vapor attemperator having a vapor and liquid chamber with a liquid level and vapor and liquid spaces therein, spaced tubes disposed within said chamber and directly connected with the outlet of the superheater to receive superheated vapor therefrom, tubular means connecting the vapor space of the attemperator with the vapor space of the drum, a header, a second circulation system of low heat input and high concentration including downcomer means directly connecting the liquid space of the attemperator with the header, the second circulation system also including tubular riser means directly connecting the liquid space of the attemperator chamber with the header and exposed to heat from said gases, blow-down conduit means directly connecting the liquid space of the drum with the header and acting to supply make-up for the second circulation system, and blow-down means communicating with the liquid of the second circulation system and operable to permit the second circulation system to be effective with its liquid at a much higher concentration than the liquid in the drum.

5. In a vapor generating and superheating unit, a high heat input low concentration first vapor generating circulation system including a vapor and liquid drum having connected therewith vapor generating tubes normally subjected to the heat of high temperature gases, a gas heated vapor superheater normally receiving vapor separated from liquid in said drum, a second vapor generating circulation system of low heat input and high concentration including an indirect vapor attemperator having spaced tubes in external contact with the vaporizable liquid, conduit means conducting superheated vapor from the superheater to and through said latter tubes, said indirect contact attemperator normally having a liquid level separating a vapor space and a liquid space therein, conduit means connecting the vapor space of the attemperator with the vapor space of the drum; said second circulation system also including a header disposed at a level beneath the level of the attemperator, downcomer means connecting the liquid space of the attemperator with the header, riser means subject to the heat of such high temperature gases and connecting the liquid space of the attemperator to the header; a blowdown conduit directly connecting the liquid space of the drum and the header, and vapor and liquid separating means disposed in the vapor space of the attemperator and having a separated vapor outlet in direct communication with the conduit means connecting the vapor space of the attemperator and the vapor space of the drum.

6. In a steam generating and superheating unit, a first steam generating section of low circulating liquid concentration generating at least a predominant proportion of the total steam from the unit, a second steam generating section of high circulating liquid concentration generating steam for at least partial condensation in the first section; each section including its own circulation system and steam and water chamber normally having a water level therein; a superheater receiving its steam from the steam and water chamber of the first section, means conducting the superheated steam through the water in the steam and water chamber of the second section whereby the second section acts as an attemperator of the superheated steam, feed water means conducting feed water to the steam and water chamber of the first section, means condensing steam from the second section by transfer of heat to the incoming feed water in the steam and water chamber of the first section, means for conducting water from the water space of the first section to the second section whereby all of the make-up of the second section is supplied by the blowdown from the first section, and blowdown means leading from the water system of the second section to atmosphere.

7. In a steam generating and superheating unit, a first steam generating section of low circulating liquid concentration generating at least a predominant proportion of the total steam from the unit, a second steam generating section of high circulating liquid concentration generating steam for at least partial condensation in the first section; each section including its own circulation system and steam and water chamber normally having a water level therein; a superheater receiving its steam from the steam and water chamber of the first section, means conducting the superheated steam through the water in the steam and water chamber of the second section whereby the second section acts as an attemperator of the superheated steam, feed water means conducting all of the feed water to the steam and water chamber of the first section, means condensing steam from the second section by transfer of heat to the incoming feed water in the steam and water chamber of the first section, means for conducting water from the water space of the first section to the second section whereby all of the make-up of the second section is supplied by the blowdown from the first section, and blowdown means leading from the water system of the second section to atmosphere.

References Cited in the file of this patent
UNITED STATES PATENTS

| | | |
|---|---|---|
| 1,964,060 | Huet | June 26, 1934 |
| 2,289,970 | Rowand et al. | July 14, 1942 |

FOREIGN PATENTS

| | | |
|---|---|---|
| 828,857 | France | Feb. 28, 1938 |
| 505,630 | Great Britain | May 11, 1939 |